US012792531B2

(12) United States Patent
Kundu et al.

(10) Patent No.: US 12,792,531 B2
(45) Date of Patent: Nov. 10, 2026

(54) SYSTEM AND METHOD FOR FACILITATING EFFICIENT PACKET FORWARDING USING A MESSAGE STATE TABLE IN A NETWORK INTERFACE CONTROLLER (NIC)

(71) Applicant: Hewlett Packard Enterprise Development LP, Spring, TX (US)

(72) Inventors: Partha Pratim Kundu, Palo Alto, CA (US); Robert Alverson, Seattle, WA (US); Duncan Roweth, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 442 days.

(21) Appl. No.: 18/529,305

(22) Filed: Dec. 5, 2023

(65) Prior Publication Data

US 2024/0106736 A1 Mar. 28, 2024

Related U.S. Application Data

(63) Continuation of application No. 17/594,533, filed as application No. PCT/US2020/024241 on Mar. 23, 2020, now Pat. No. 11,855,881.

(Continued)

(51) Int. Cl.
*G06F 13/16* (2006.01)
*G06F 9/50* (2006.01)

(Continued)

(52) U.S. Cl.
CPC .......... *G06F 13/1642* (2013.01); *G06F 9/505* (2013.01); *G06F 9/546* (2013.01); *G06F 12/0862* (2013.01); *G06F 12/1036* (2013.01); *G06F 12/1063* (2013.01); *G06F 13/14* (2013.01); *G06F 13/16* (2013.01); *G06F 13/1673* (2013.01); *G06F 13/28* (2013.01);

(Continued)

(58) Field of Classification Search
CPC ... H04L 1/0083; H04L 43/0876; H04L 43/10; H04L 45/02; H04L 45/021; H04L 45/028; H04L 45/122; H04L 45/123; G06F 13/1642; G06F 9/505; G06F 9/546; G06F 12/0862; G06F 12/1036; G06F 12/1063; G06F 13/14; G06F 13/16; G06F 13/1673
See application file for complete search history.

(56) References Cited

U.S. PATENT DOCUMENTS

2008/0126553 A1* 5/2008 Boucher ................. H04L 69/16 709/230
2010/0325495 A1* 12/2010 Talla ................... H04L 67/1034 714/49

(Continued)

*Primary Examiner* — Oussama Roudani
(74) *Attorney, Agent, or Firm* — Yao Legal Services, Inc.

(57) ABSTRACT

One embodiment provides a network interface controller (NIC). The NIC can include a storage device, a network interface, a hardware list-processing engine (LPE), and a message state table (MST) logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

20 Claims, 7 Drawing Sheets

Related U.S. Application Data

(60) Provisional application No. 62/852,289, filed on May 23, 2019, provisional application No. 62/852,203, filed on May 23, 2019, provisional application No. 62/852,273, filed on May 23, 2019.

(51) Int. Cl.

| | |
|---|---|
| ***G06F 9/54*** | (2006.01) |
| ***G06F 12/0862*** | (2016.01) |
| ***G06F 12/1036*** | (2016.01) |
| ***G06F 12/1045*** | (2016.01) |
| ***G06F 13/14*** | (2006.01) |
| ***G06F 13/28*** | (2006.01) |
| ***G06F 13/38*** | (2006.01) |
| ***G06F 13/40*** | (2006.01) |
| ***G06F 13/42*** | (2006.01) |
| ***G06F 15/173*** | (2006.01) |
| ***H04L 1/00*** | (2006.01) |
| ***H04L 43/0876*** | (2022.01) |
| ***H04L 43/10*** | (2022.01) |
| ***H04L 45/00*** | (2022.01) |
| ***H04L 45/02*** | (2022.01) |
| ***H04L 45/021*** | (2022.01) |
| ***H04L 45/028*** | (2022.01) |
| ***H04L 45/12*** | (2022.01) |
| ***H04L 45/122*** | (2022.01) |
| ***H04L 45/125*** | (2022.01) |
| ***H04L 45/16*** | (2022.01) |
| ***H04L 45/24*** | (2022.01) |
| ***H04L 45/42*** | (2022.01) |
| ***H04L 45/745*** | (2022.01) |
| ***H04L 47/10*** | (2022.01) |
| ***H04L 47/11*** | (2022.01) |
| ***H04L 47/12*** | (2022.01) |
| ***H04L 47/122*** | (2022.01) |
| ***H04L 47/20*** | (2022.01) |
| ***H04L 47/22*** | (2022.01) |
| ***H04L 47/24*** | (2022.01) |
| ***H04L 47/2441*** | (2022.01) |
| ***H04L 47/2466*** | (2022.01) |
| ***H04L 47/2483*** | (2022.01) |
| ***H04L 47/30*** | (2022.01) |
| ***H04L 47/32*** | (2022.01) |
| ***H04L 47/34*** | (2022.01) |
| ***H04L 47/52*** | (2022.01) |
| ***H04L 47/62*** | (2022.01) |
| ***H04L 47/625*** | (2022.01) |
| ***H04L 47/6275*** | (2022.01) |
| ***H04L 47/629*** | (2022.01) |
| ***H04L 47/76*** | (2022.01) |
| ***H04L 47/762*** | (2022.01) |
| ***H04L 47/78*** | (2022.01) |
| ***H04L 47/80*** | (2022.01) |
| ***H04L 49/00*** | (2022.01) |
| ***H04L 49/101*** | (2022.01) |
| ***H04L 49/15*** | (2022.01) |
| ***H04L 49/90*** | (2022.01) |
| ***H04L 49/9005*** | (2022.01) |
| ***H04L 49/9047*** | (2022.01) |
| ***H04L 67/1097*** | (2022.01) |
| ***H04L 69/22*** | (2022.01) |
| ***H04L 69/40*** | (2022.01) |
| *H04L 45/28* | (2022.01) |
| *H04L 45/7453* | (2022.01) |
| *H04L 69/28* | (2022.01) |

(52) U.S. Cl.

CPC ........ *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(56) References Cited

U.S. PATENT DOCUMENTS

| | | | | |
|---|---|---|---|---|
| 2015/0288624 | A1* | 10/2015 | Raindel | H04L 49/9047 709/219 |
| 2017/0054633 | A1* | 2/2017 | Underwood | G06F 15/167 |
| 2017/0093770 | A1* | 3/2017 | Flajslik | H04L 51/212 |

* cited by examiner

SYSTEM AND METHOD FOR FACILITATING EFFICIENT PACKET FORWARDING USING A MESSAGE STATE TABLE IN A NETWORK INTERFACE CONTROLLER (NIC)

CROSS REFERENCE TO RELATED APPLICATIONS

This application is a continuation of U.S. patent application Ser. No. 17/594,533, filed on Oct. 21, 2021, which application is a national stage of International Application No. PCT/US2020/024241, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating MPI (message passing interface) list matching for out-of-order packets in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

The disclosed embodiments provide a network interface controller (NIC) capable of performing message passing interface (MPI) list matching for out-of-order packets. The NIC can include a storage device, a network interface, a hardware list-processing engine (LPE), and a message state table (MST) logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

BRIEF DESCRIPTION OF THE FIGURES

In the figures, like reference numerals refer to the same figure elements.

DETAILED DESCRIPTION

Figure 1:
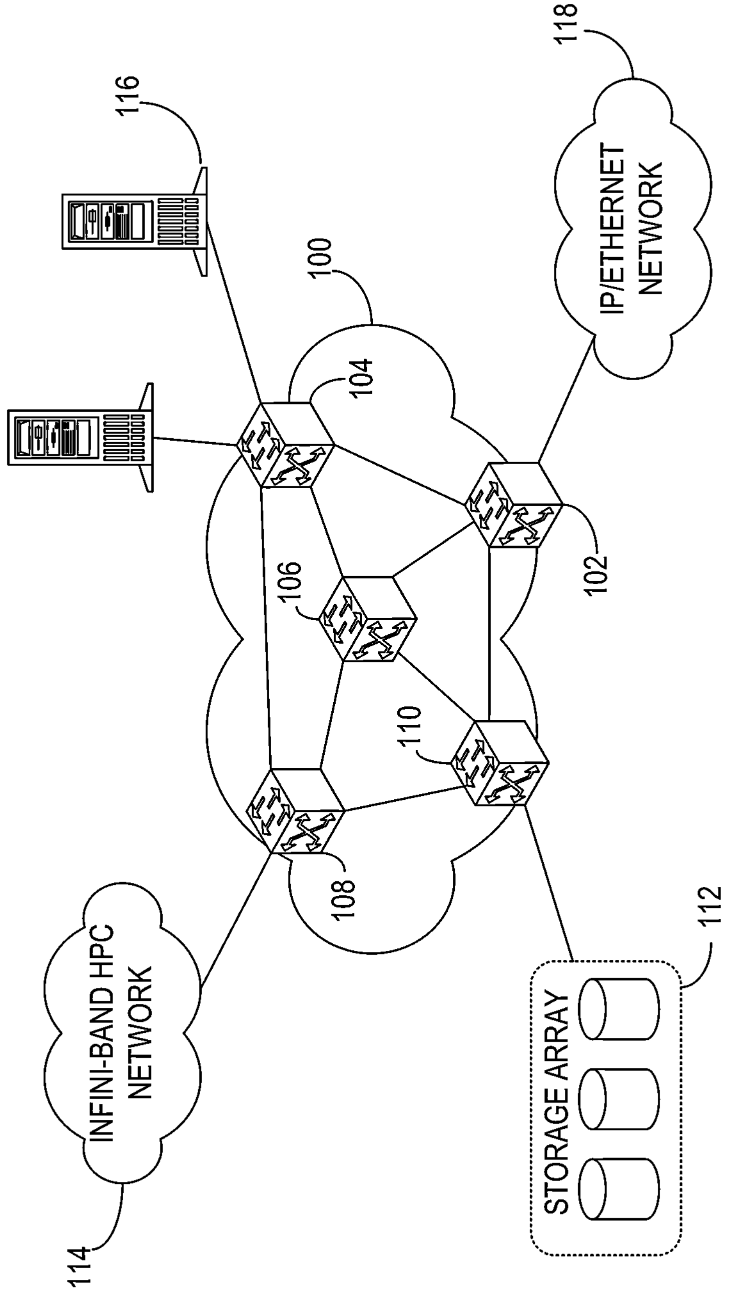
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate MPI list matching for out-of-order packets of a multi-packet message or a retry packet for a single-packet message in a network interface controller (NIC). The NIC can include a message state table (MST) logic block having a plurality of interfaces for interfacing with other logic blocks of the NIC. More specifically, the MST logic block can include a match interface that can receive list-matching results for a first packet of a multi-packet message and an MST memory logic block for storing the list-matching results (which can include at least the target memory address and length) together with other header information generated by the list-processing engine (LPE). When subsequent continuation packets for the same message are received, which can be out of order, instead of requiring the list-processing engine to perform list matching again, the MST memory can be queried to provide the matching results. The MST can also be used to store matching results of unrestricted single packets, which can be used in the event of a retry.

One embodiment provides a NIC. The NIC can include a storage device, a network interface, a hardware list-processing engine (LPE), and an MST logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

In a variation on this embodiment, the message is associated with a direct memory access (DMA) or a remote direct memory access (RDMA) operation.

In a further variation, the message can include a multi-packet PUT message, a GET message, or a single-packet atomic memory operations (AMO) message.

In a further variation, the message includes a multi-packet PUT message. The first packet is the initial packet of the multi-packet PUT message, the second packet is a continuation packet in the message, and the second packet is delivered out of order.

In a further variation, the message includes a single-packet message, and the second packet belongs to a retry message of the single-packet message.

In a variation on this embodiment, the MST logic block can set a bit associated with an entry in the MST when the LPE provides message-matching results for a message associated with the entry.

In a further variation, a request to read the message-matching results associated with the entry is processed subsequent to the bit associated with the entry being set.

In a variation on this embodiment, the MST logic block can arbitrate among respective head requests of a plurality of request queues for providing access to the MST.

In a variation on this embodiment, the MST logic block can generate a completion event in response to the network interface controller receiving a response to a last packet associated with the message. The MST can then deallocate an entry from the MST corresponding to the message.

In a variation on this embodiment, a respective entry in the MST is associated with an index, and wherein the index is available for reuse subsequent to the corresponding entry being deallocated from the MST.

Figure 2A:
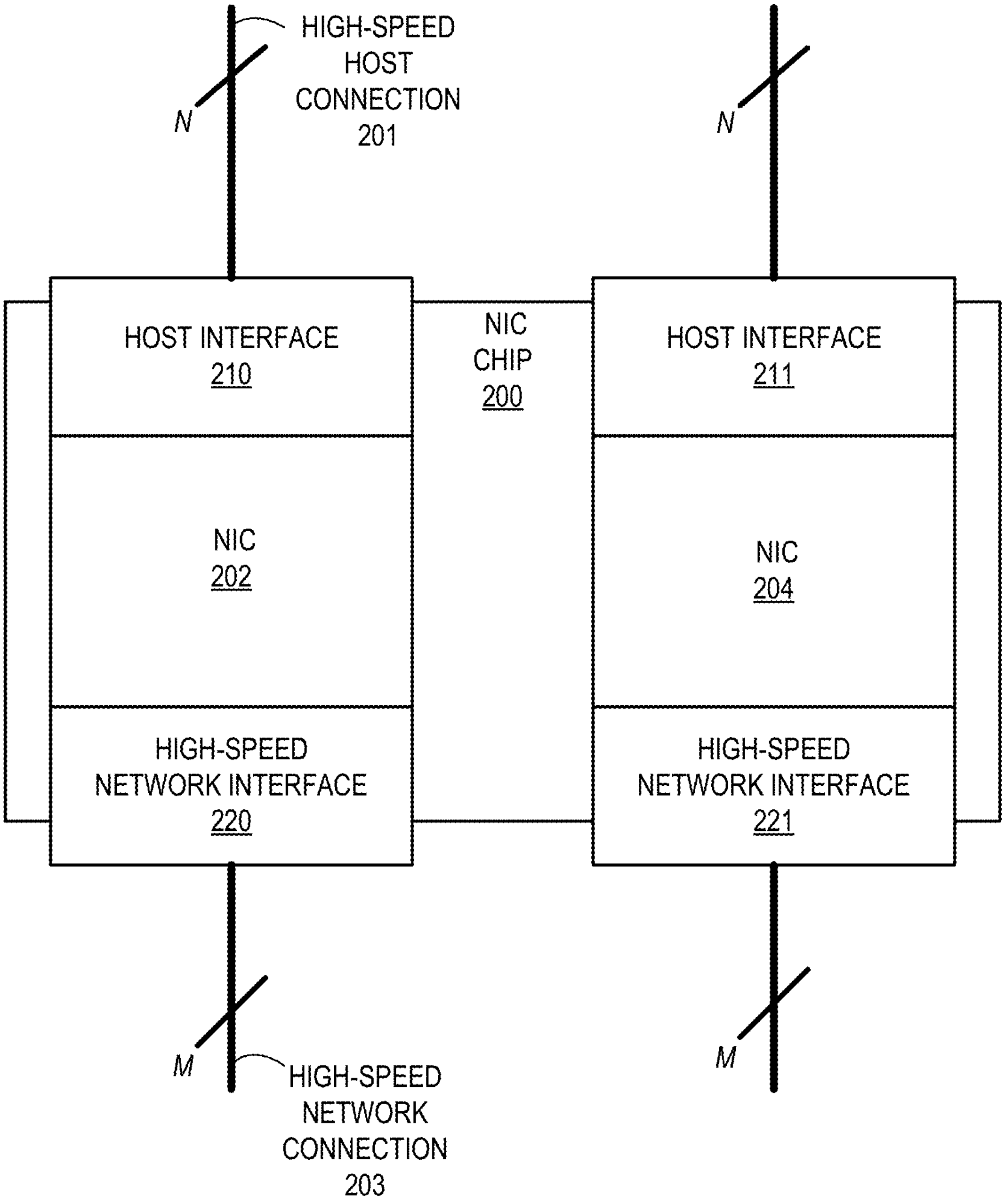
FIG. 2A shows an exemplary NIC chip with a plurality of NICs.

In this disclosure, the description in conjunction with FIG. 1 is associated with the network architecture, and the description in conjunction with FIG. 2A and onward provide more details on the architecture and operations associated with a NIC that supports efficient list matching for out-of-order packets.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one high-speed network interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on message passing interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and atomic memory operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
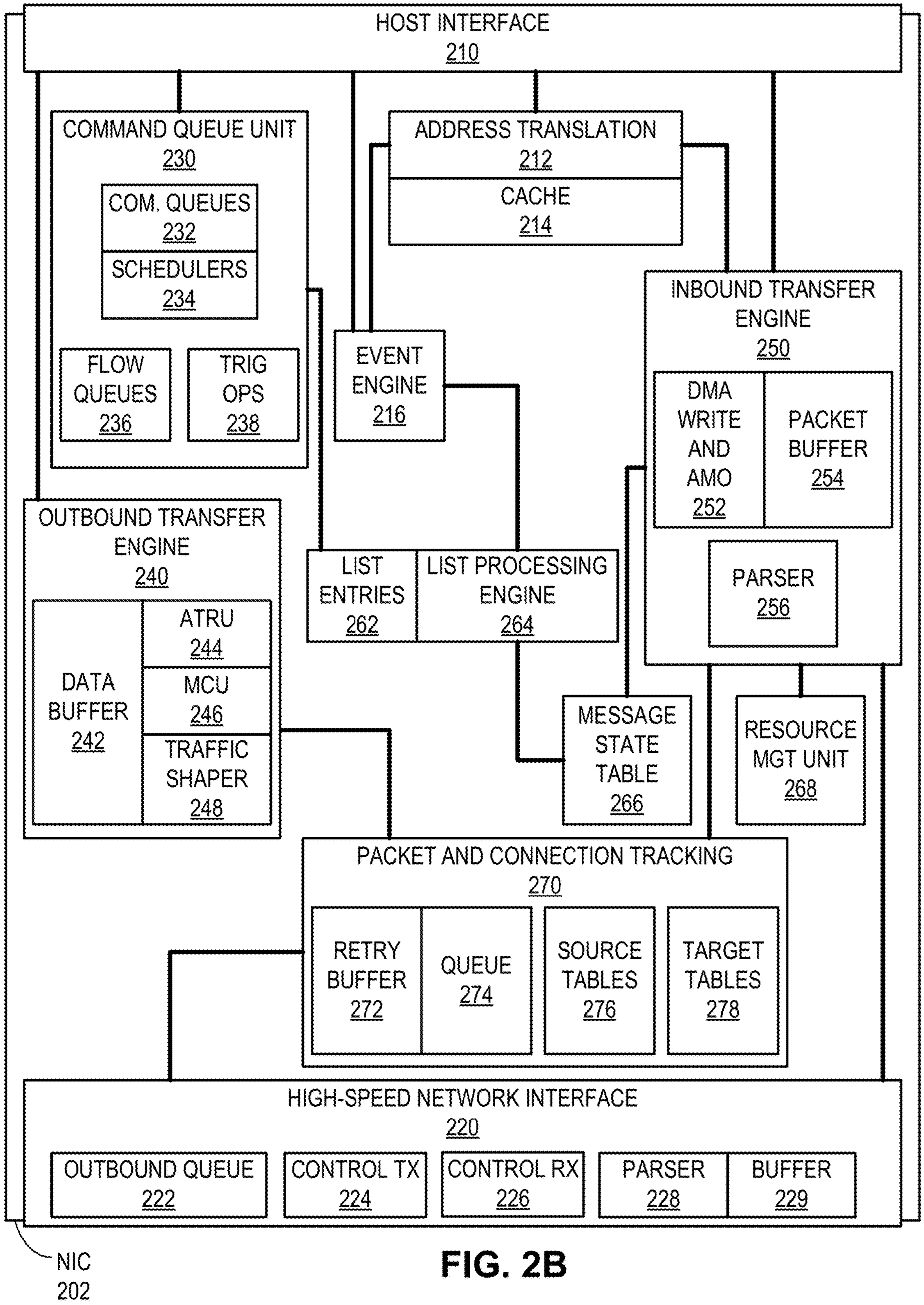
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a command queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (append, search, etc.), respectively. Command queues 232 can be implemented as circular buffers. In some embodiments, command queues 232 can be maintained in the main memory of the host. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The data received from the host can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be obtained from retry buffer 272 to facilitate the retry operation. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a message state table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Message State Table

In MPI, send/receive operations can be identified with an envelope that can include a number of parameters such as source, destination, message ID, and communicator. The envelope can be used to match a given message to its corresponding user buffer. The whole list of buffers posted by a given process is referred to as the matching list, and the process of finding the corresponding buffer from the matching list to a given buffer is referred to as list matching or tag matching.

In some embodiments, processing of the MPI messages, including both the "eager" message and the "rendezvous" message, can be offloaded to the NIC hardware, which can also provide hardware acceleration of MPI list matching. However, the MPI lists can be required to be matched in order. In situations where packets are received out of order, the list-processing engine in the NIC cannot maintain order and can produce incorrect matching results. Note that out-of-order delivery of network packets can provide certain performance advantages and can sometimes be the preferred packet-delivery method.

For example, an application, which may run on a source device of a NIC, can issue a message indicating a data operation (e.g., a "GET" or a "PUT" command of remote direct memory access (RDMA)) for a memory location of a remote target device. The NICs of the source and target devices can be referred to as the source and target NICs, respectively. The operation can be an idempotent or a non-idempotent operation. An idempotent operation may be executed more than once without causing an error. On the other hand, a non-idempotent operation can be executed once. Executing a non-idempotent operation more than once may cause an error. Typically, if an idempotent RDMA operation is not completed, instead of the target NIC executing the operation, the software of the target device (e.g., an operating system) may replay the operation.

The message indicating the operation can be a large message that may be transmitted via a plurality of packets. Ordered delivery of such a large message may incur significant overhead, such as transmission over a predetermined path, strict enforcement of in-order packet transmission, and packet drops for out-of-order packets, which can lead to inefficient data forwarding. To solve this problem, the source NIC can use both ordered and unordered packet delivery for the message to improve performance while preserving order at message boundaries. In particular, if the message is for an idempotent operation, the NIC may send some of the packets based on unordered delivery. During operation, the source NIC may receive a message larger than a maximum transmission unit (MTU). Accordingly, the source NIC can generate a plurality of packets from the message based on the MTU. Since the plurality of packets may include a portion of the message in their respective payloads, these packets can be referred to as a packet stream. The source NIC can send a first packet using ordered delivery to the target NIC. Subsequent to receiving a response to the first packet, the source NIC can determine whether the number of the remaining packets of the packet stream is greater than a threshold. In some embodiments, the threshold can correspond to a packet number for which the transfer time is greater than twice the round-trip time (RTT) between the source and target NICs.

If the number of remaining packets is greater than the threshold, the source NIC can initiate an in-out-in (MI) packet transfer for the packet stream. To facilitate IOI packet transfer, the source NIC can forward an initial set of packets with ordered delivery. Each of these packets can include a sequence number and an indicator indicating in-order delivery. The target NIC may receive one or more packets, and issue corresponding responses. A response can also be a cumulative response since these packets are ordered packets. However, since the responses may not be ordered, the source NIC may receive any of the responses. Based on the first received response, the source NIC can determine that all packets up to the sequence number of the response have been successfully received by the target NIC.

The source NIC can then switch to unordered delivery for the subsequent packets. When the number of remaining packets becomes less than a switchover threshold (i.e., the packets with the end of the message), the source NIC can switch back to ordered delivery. In some embodiments, the switchover threshold can indicate the number of outstanding packets. An outstanding packet is a packet for which the source NIC has not received a response yet. To further ensure that the last packet is delivered in order, the source NIC may refrain from sending the last packet of the packet stream until the source NIC has received responses for all unordered packets. In this way, the source NIC can use 101 packet transfer that can incorporate both ordered and unordered packet delivery, thereby facilitating efficient packet forwarding for large messages.

To facilitate the 101 packet transfer, the NIC can implement a message state table (MST), which stores previous results of message matching. The NIC can store the MST in a storage device (e.g., a memory module) of the NIC. For example, the MST can store the matching result of an initial packet of the packet stream, which is delivered in order. When subsequent packets of the same packet stream are received, rather than having the list-processing engine to perform list matching and preserve order, the MST can be queried to obtain the corresponding matching result.

Figure 3:
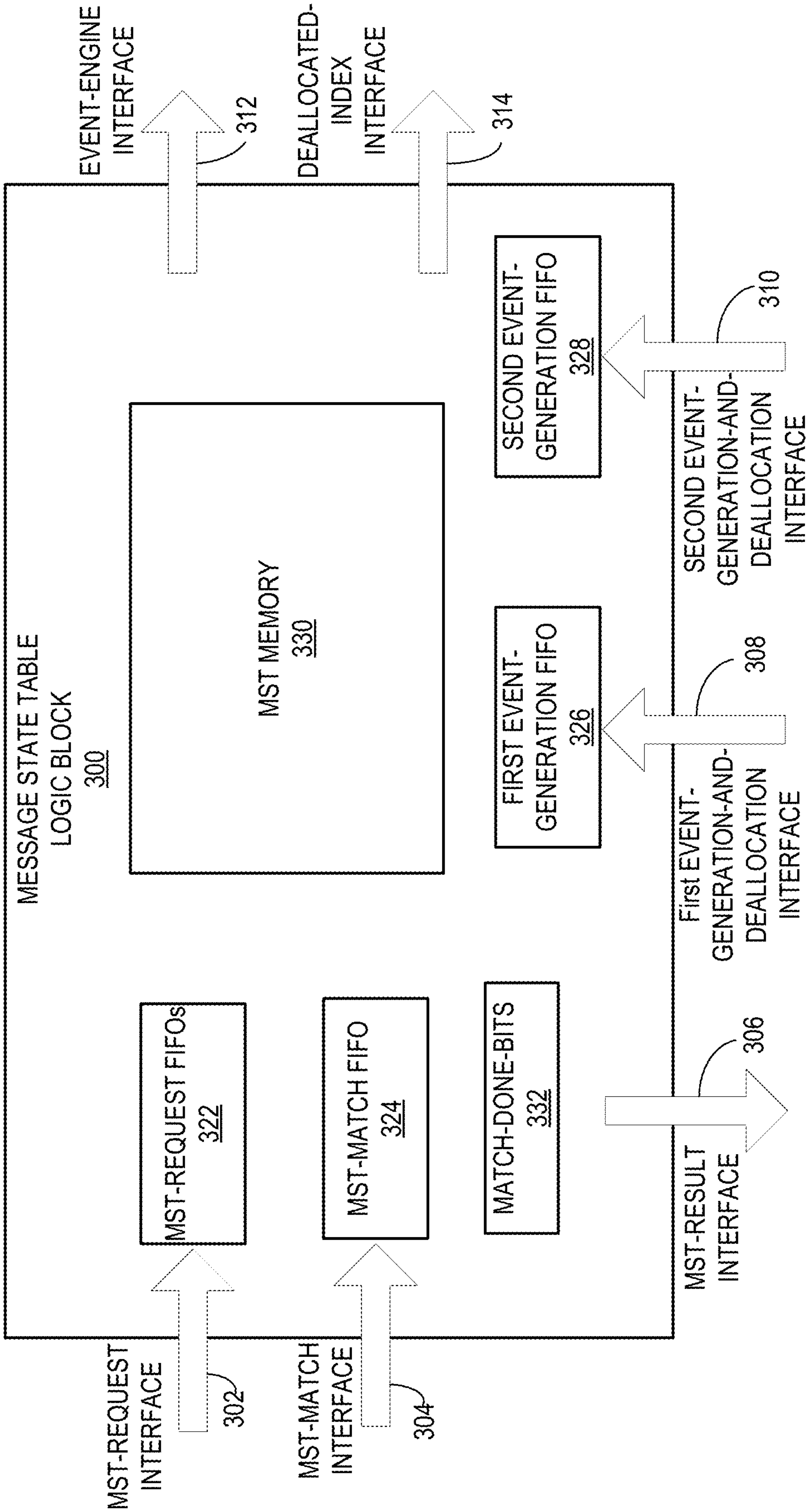
FIG. 3 shows an exemplary architecture of the message state table (MST) logic block.

FIG. 3 shows an exemplary architecture of the MST logic block. MST logic block 300 can include a plurality of interfaces and a plurality of subblocks that operate together and also interface with other blocks in the NIC to facilitate the list-matching operation for out-of-order packets.

The interfaces of MST logic block 300 can include an MST-request interface 302, an MS-match interface 304, a MST-result interface 306, a first event-generation-and-deallocation interface 308, and a second event-generation-and-deallocation interface 310, an event-engine interface 312, and a deallocated-index interface 314. The subblocks of MST logic block 300 can include a set of MST-request first-in, first-out (FIFO) queues 322, an MST-match FIFO 324, a first event-generation FIFO 326, a second event-generation FIFO 328, an MST memory 330, and a match-done-bits data block 332.

MST-request interface 302 can allow MST logic block 300 to receive requests from the IXE to read the matching result for each communication packet of an unrestricted message. Note that the NIC can support both restricted and unrestricted transfers, which differ in their ordering and in their target behavior. Restricted transfers may be unordered and unrestricted transfers require ordering to be maintained, at least at the message level. Note that restricted PUT, GET, and AMO operations may not use MST logic block 300.

MST-match interface 304 can allow MST logic block 300 to receive matching results for an unrestricted message from the IXE. This update may occur on the first packet of the message. MST-result interface 306 can allow MST logic block 300 to return back the matching result stored in MST memory 330.

First event-generation-and-deallocation interface 308 can allow MST logic block 300 to receive a notification from the packet and connection tracking (PCT) module, when the PCT module receives a clear request for the last packet of an unrestricted single- or multi-packet GET message, the notification can cause MST logic block 300 to generate a completion event and deallocate the corresponding entry for that GET message. This path also includes packet error notification.

Second event-generation-and-deallocation interface 310 can provide a path for MST logic block 300 to receive two types of commands from the PCT packet-out block. The first type of command is event generation and deallocation. When the last response of a multi-packet unrestricted PUT message is sent out by the PCT packet-out block, it notifies the MST to generate a completion event and deallocate the entry for that message. The second type of command can be a command indicating a packet error for a PUT or GET message. When the PCT module sends out an error response packet of either an unrestricted multi-packet PUT message or an unrestricted single- or multi-packet GET message, the PCT module notifies MST logic block 300 and the error is logged in the MST entry for that message.

Event-engine interface 312 may allow MST logic block 300 to generate and send an event to the event engine after a message has been complete. Deallocated-index interface 314 may allow MST logic block 300 to notify the PCT module that an entry has been deallocated and the MST index can be reused.

MST-request FIFOs 322 can include a set of FIFOs that accept MST requests from the IXE via MST-request interface 302. In some embodiments, MST-request FIFOs 322 can include 32 linked-list FIFOs. MST-match FIFO 324 is a FIFO that accepts MST matching results from the IXE via MST-match interface 304.

First event-generation FIFO 326 can include a FIFO that accepts event-generation/deallocation requests from the PCT target-side clear engine via first event-generation-and-deallocation interface 308. Second Event-Generation FIFO 328 can include a FIFO that accepts event-generation/deallocation request and PUT and GET error updates for messages from the PCT packet outbound path via second event-generation-and-deallocation interface 310.

MST memory 330 can include a table that stores the matching results (which can include at least the target memory address and length) together with other header information generated by the LPE. In some embodiments, MST memory 330 can include a table that can hold 2048 entries. MST memory 330 can include a content-addressable memory (CAM) that can be used to identify the entry in the table to use for a message. In some embodiments, the CAM can be located in the PCT module. The PCT module is responsible for managing the credits and allocation of the MST entries. Before the IXE sends in an MST request or MST match to MST logic block 300, the IXE may obtain the MST index from the PCT. The request can then be sent, via the appropriate interface, to MST logic block 300 along with the index that it is assigned.

Match-done-bits data block 332 can include a set of bits that specify whether matching results have been provided for each of the messages. In the event that MST memory logic block 300 includes a 2K-entry table, the set of bits can include 2048 bits.

Figure 4A:
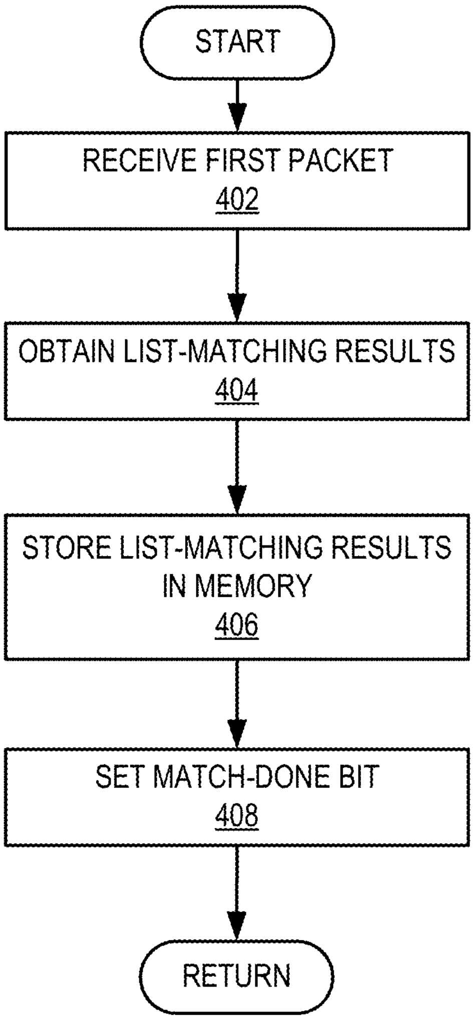
FIG. 4A shows a flowchart illustrating the exemplary process of storing list-matching results in the MST.

FIG. 4A shows a flowchart illustrating the exemplary process of storing list-matching results in the MST. At the target NIC, the IXE can receive the initial packet of an unrestricted message (operation 402) and subsequently obtain the list-matching results that include the target address and other information for this message through a list-matching process (operation 404). The initial packet can include the message envelope. The list-matching process can be performed by a hardware list-processing engine. The unrestricted message can be associated with a DMA or RDMA operation (e.g., PUT or GET). For multi-packet PUT and all GET messages, the IXE can send the matching results to the MST. The matching results can be sent to MST-match FIFO via the MST-match interface.

Subsequent to MST memory block, which holds the MST, storing the matching results forwarded by the MST-match FIFO (operation 406), the MST can set a corresponding "match-done" bit (operation 408), indicating that the matching results are available and can be used when processing the rest of the message.

Figure 4B:
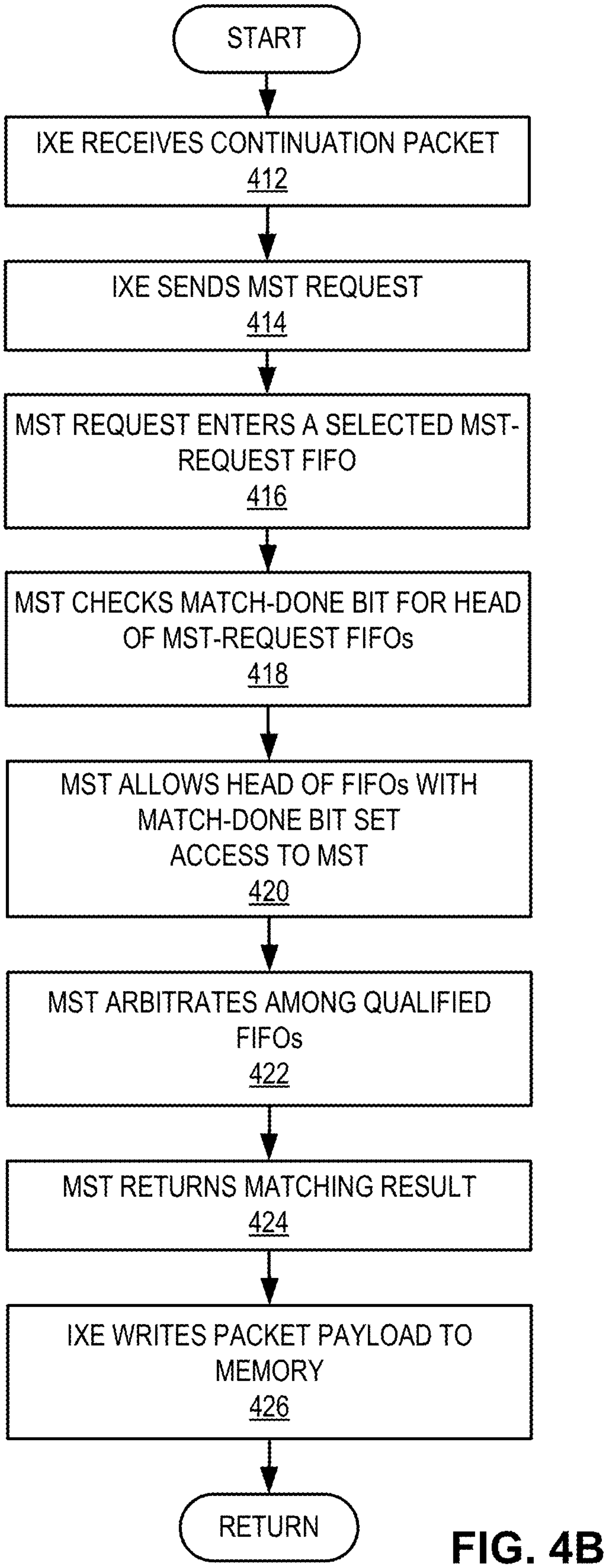
FIG. 4B shows a flowchart illustrating the exemplary process of obtaining list-matching results from the MST.

FIG. 4B shows a flowchart illustrating the exemplary process of obtaining list-matching results from the MST. During operation, the IXE of the target NIC can receive a subsequent continuation packet for a message (operation 412), and send an MST request to read back the matching result of the message via the MST-request interface (operation 414). The MST request can enter one of the MST-request FIFOs (operation 416). In some embodiments, the MST logic block can select an MST-request FIFO to enqueue the MST request based on a hashed result of the MST index and the traffic class (TC) number of the request. The MST index can have multiple bits (e.g., 11-bit) and the TC number can have a smaller set of bits (e.g., 3-bit).

The MST can check the corresponding "match-done" bit of the head of each FIFO to determine if it is set and if there is a credit available to return the matching results via the match-result interface (operation 418). If so, the MST request at the head of the FIFO is allowed to access the MST (operation 420). This is because the continuation packet may arrive before the matching result of the first packet has arrived. This qualification process allows the MST logic block to block the progress of the continuation packets until the result of the match is available. When checking for credit availability for returning the result of a match request, the MST logic block can use two credit pools dependent on whether the request is a PUT or a GET. Each type of message gets its own credit pool.

All qualified FIFOs can be arbitrated (e.g., using round-robin) to access the MST (operation 422). The matching result corresponding to the granted match request can then be returned to the IXE via the MST-result interface (operation 424). Once the IXE obtains the matching result for each continuation packet, the IXE can write the payload data to memory (operation 426).

In the examples shown in FIGS. 4A-4B, the MST is used for unrestricted multi-packet messages. In practice, the MST can also store the matching results for unrestricted single-packet GET messages. The matching result for such a message can be sent through by the IXE to the MST via the MST-match interface. There is no continuation packet tor this type of message, and the MST is only used for remembering the matching result in case of a retry. In the case of the retry, when the IXE requests the MST index, the PCT will return the already existing MST index, and the information that the pack is a retry packet. This allows the IXE to recover the original matching results from the MST entry. On the other hand, sending the match request to the LPE a second time would be an error.

In addition, the MST may not be used for any other single-packet requests. However, the MST is not used for any restricted messages. Matching results can be read from the MST for continuation packets, which may be delivered in any order.

The processing of the retry packets depends on the packet type. If the retry packet is an unrestricted GET, an MST request can be sent to read back the matching result via the MST-request interface and the MST-request FIFOs. This is because the matching operation performed by the LPE may not be idempotent. To replay the GET response, the IXE may need to obtain the original matching result stored in the MST. If the retry packet is an unrestricted PUT or AMO, the PCT can detect that the request is a retry and then recreates a response from the target result store (TRS) and directs the IXE to drop the packet. The TRS can store packet-level information for non-idempotent operations. Hence, the MST is not accessed.

The MST can also log errors that have occurred at the message level for unrestricted multi-packet PUT or GET messages, and unrestricted single-packet GET messages. When the PCT sends out an error response packet for either an unrestricted multi-packet PUT message or an unrestricted single- or multi-packet GET message, an error notification can be sent to the MST through the second event-generation FIFO and the second event-generation-and-deallocation interface. These errors are accumulated in the corresponding MST entries.

It is also the responsibility of the MST logic block to generate and send an event to the event engine through the event-engine interface once a message that it is tracking is complete. For an unrestricted multi-packet PUT message, once its last-response packet is sent out by the PCT, the MST logic block can be notified to generate an event and also to deallocate the entry through a path that includes the second event-generation FIFO and the second event-generation-and-deallocation interface. For an unrestricted single-packet or multi-packet GET message, after a "clear" command is received by the PCT for the message, indicating that a response to the last packet in the message is received, the MST logic block is notified to generate the event and also to deallocate the MST entry through a path that includes the first event-generation FIFO and the first event-generation-and-deallocation interface. These notifications pass through the first and second event-generation FIFOs before arbitrating for access of the MST to generate the event. Once the event is generated, it is sent to the event engine through the event-engine interface. The corresponding MST entry is then deallocated from the MST and the index of the entry can be sent back to the PCT for reuse through the deallocated-Index interface.

Exemplary Computer System

Figure 5:
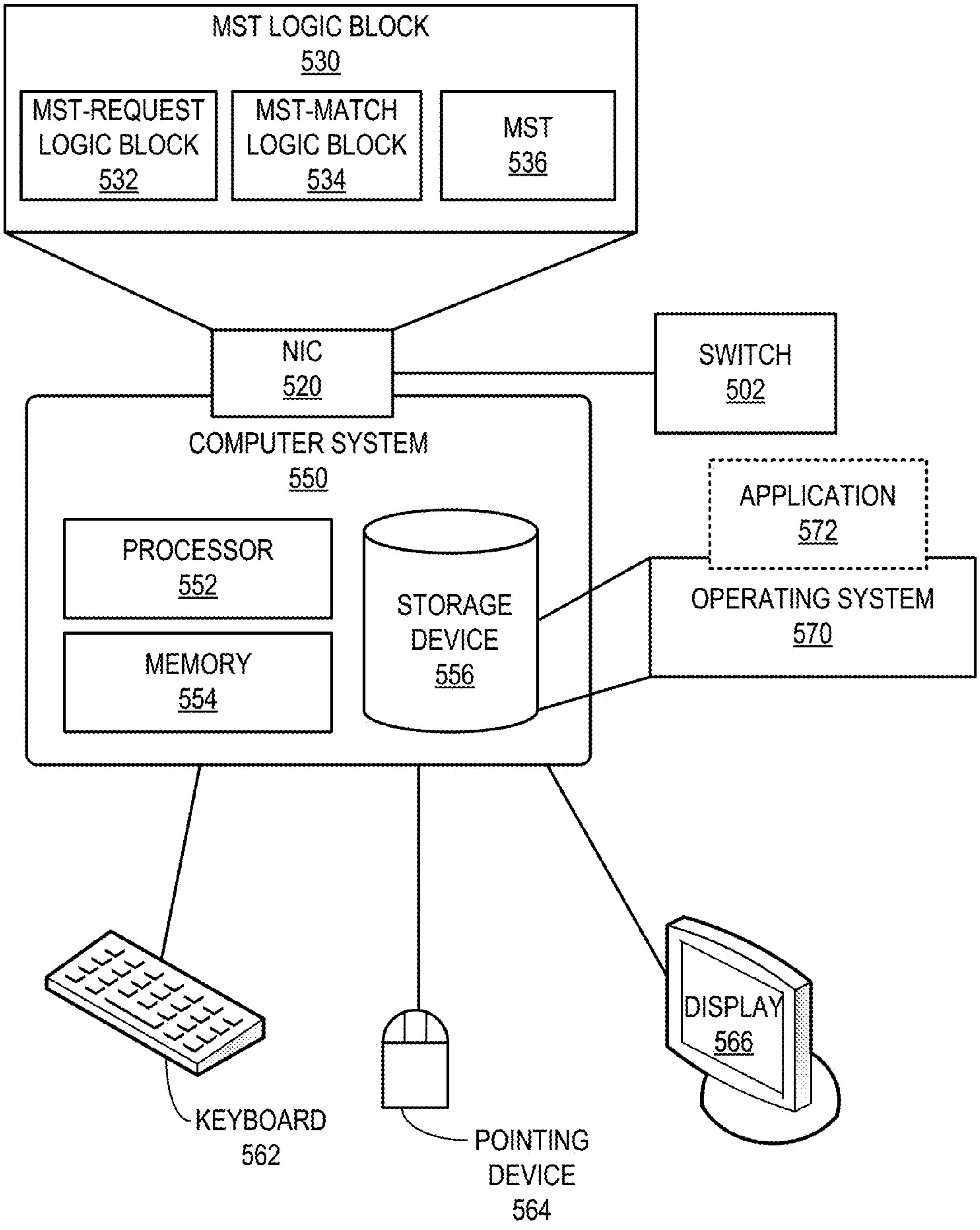
FIG. 5 shows an exemplary computer system equipped with a NIC that facilitates MPI list matching for out-of-order packets.

FIG. 5 shows an exemplary computer system equipped with a NIC that facilitates MPI list matching for out-of-order packets. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates MPI list matching for out-of-order packets. NIC 520 can provide one or more HNIs to computer system 550. NIC 520 can be coupled to a switch 502 via one of the HNIs. NIC 520 can include a MST logic block 530, as described in conjunction with FIG. 2B and FIG. 3. MST logic block 530 can include an MST-request logic block 532 that receives MST requests, an MST-match logic block 534 that may receive matching results from the list-matching engine, and an MST 536 for storing the matching results. In summary, the present disclosure describes a NIC that implements an MST.

The NIC can include a storage device, a network interface, a hardware LPE, and an MST logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:

receiving, by a network interface controller (NIC), a request to read matching results associated with a first packet of a multi-packet message and stored in a data structure indicating a state of a respective message, the request associated with a subsequent packet of the multi-packet message;

placing the request in a queue of a plurality of queues;

checking, for a respective queue of the plurality of queues, an indicator of whether to allow the respective queue to access the matching results;

determining, based on the indicator, that the respective queue is allowed to access the matching results;

granting, to the respective queue, access to the matching results in response to determining that the respective queue is allowed to access the matching results;

determining a set of qualified queues in response to checking the indicator;

arbitrating the set of qualified queues based on a scheduling algorithm;

allowing a request placed in a respective qualified queue to obtain the corresponding matching results; and subsequent to the matching results being obtained, writing, by an inbound transfer engine of the NIC, a payload of a respective packet to a memory of a host device associated with the NIC.

2. The method of claim 1, further comprising:

selecting the queue in which the request is placed.

3. The method of claim 2, wherein selecting the queue comprises applying a hash function to at least one of:

an index of an entry in the data structure; and a number of a traffic class associated with the request.

4. The method of claim 1, further comprising:

receiving, by an inbound transfer engine of the NIC, the first packet of the multi-packet message;

storing the state of the multi-packet message in the matching results of the data structure;

receiving, by the inbound transfer engine of the NIC, the subsequent packet; and generating, by the inbound transfer engine, the request to read the matching results associated with the subsequent packet of the multi-packet message.

5. The method of claim 1, wherein checking the indicator comprises:

determining that a bit at a head of the respective queue indicates that the matching results are available to be used when processing a remainder of the associated message;

determining that a credit is available to return the matching results; and responsive to determining that the bit is set and that the credit is available, determining that the respective queue is allowed to access the matching results.

6. The method of claim 1, wherein the multi-packet message comprises at least one of:

a PUT message;

a GET message; and an atomic memory operations (AMO) message.

7. The method of claim 1, further comprising:

receiving, by the NIC, a retry request to read matching results associated with a single-packet GET message, wherein the retry request is associated with a retry packet, and wherein an entry in the data structure stores matching results for the single-packet GET message.

8. The method of claim 7, further comprising:

returning, to an inbound transfer engine of the NIC:

an index of the entry in the data structure storing the matching results associated with the single-packet GET message; and an indicator of the retry packet.

9. A network interface controller (NIC), comprising:

a storage device to store a data structure which indicates user buffers corresponding to messages and a state of a respective message, the data structure comprising matching results associated with a first packet of a multi-packet message initially received by the NIC;

a message state table (MST) logic block comprising an MST-request interface, an MST-match interface, an MST-result interface, MST-request first-in-first-out (FIFO) queues, an MST-match FIFO, MST memory, and match-done bits, the message state table logic block to:

receive a request to read matching results associated with the multi-packet message, the multi-packet message associated with at least one subsequent packet;

select a queue of a plurality of queues;

insert the request into the selected queue;

check, for a respective queue of the plurality of queues, an indicator of whether to allow the respective queue to access the matching results;

determine, based on the indicator, that the respective queue is allowed to access the matching results;

grant, to the respective queue, access to the matching results in response to determining that the respective queue is allowed to access the matching results;

determine a set of qualified queues in response to checking the indicator;

arbitrate the set of qualified queues based on a scheduling algorithm; and allow a request placed in a respective qualified queue to obtain the corresponding matching results; and an inbound transfer engine comprising a direct memory access (DMA) write and atomic memory operation (AMO) unit, a packet buffer, a parser, and a list processing engine, the inbound transfer engine to receive the first packet and one or more subsequent packets of the multi-packet message, wherein, subsequent to the matching results being obtained, the inbound transfer engine is further to write a payload of a respective packet to a memory of a host device associated with the NIC.

10. The network interface controller of claim 9, wherein the message state table logic block is further to:

select the queue by applying a hash function to at least one of:

an index of an entry in the data structure; and a number of a traffic class associated with the request.

11. The network interface controller of claim 9, further comprising:

an inbound transfer engine comprising a direct memory access (DMA) write and atomic memory operation (AMO) unit, a packet buffer, a parser, and a list processing engine, the inbound transfer engine to receive the first packet and one or more subsequent packets of the multi-packet message.

12. The network interface controller of claim 11, wherein, subsequent to receiving the first packet and the storage device storing the matching results in the data structure, the inbound transfer engine is further to:

generate the request to read the matching results associated with a subsequent packet of the multi-packet message.

13. The network interface controller of claim 9, wherein the message state table block checking the indicator for the respective queue is further to:

determine that a bit at a head of the respective queue indicates that the matching results are available to be used when processing a remainder of the associated message;

determine that a credit is available to return the matching results; and determine that the respective queue is allowed to access the matching results in response to determining that the bit is set and that the credit is available.

14. The network interface controller of claim 9, the multi-packet message comprising at least one of:

a PUT message;

a GET message; and an atomic memory operations (AMO) message.

15. The network interface controller of claim 14, wherein the message state table logic block is further to:

receive a notification of an error associated with the multi-packet message, the notification comprising an error response packet associated with the multi-packet message; and log the error associated with the multi-packet message.

16. A non-transitory computer-readable storage medium storing instructions to:

receive a request to read matching results associated with a first packet of a multi-packet message and stored in a data structure indicating a state of a respective message, the request associated with a subsequent packet of the multi-packet message;

place the request in a queue of a plurality of queues;

check, for a respective queue of the plurality of queues, an indicator of whether to allow the respective queue to access the matching results;

determine, based on the indicator, that the respective queue is allowed to access the matching results;

grant, to the respective queue, access to the matching results in response to determining that the respective queue is allowed to access the matching results;

determine a set of qualified queues in response to checking the indicator;

arbitrate the set of qualified queues based on a scheduling algorithm;

allow a request placed in a respective qualified queue to obtain the corresponding matching results; and subsequent to the matching results being obtained, write, by an inbound transfer engine of the NIC, a payload of a respective packet to a memory of a host device associated with the NIC.

17. The non-transitory computer-readable storage medium of claim 16, wherein the instructions further comprise instructions to:

select the queue in which the request is placed.

18. The non-transitory computer-readable storage medium of claim 17, wherein the instructions to select the queue comprise instructions to:

apply a hash function to at least one of:

an index of an entry in the data structure; and a number of a traffic class associated with the request.

19. The non-transitory computer-readable storage medium of claim 16, wherein the instructions further comprise instructions to:

receive, by an inbound transfer engine of the NIC, the first packet of the multi-packet message;

store the state of the multi-packet message in the matching results of the data structure;

receive, by the inbound transfer engine of the NIC, the subsequent packet; and generate, by the inbound transfer engine, the request to read the matching results associated with the subsequent packet of the multi-packet message.

20. The non-transitory computer-readable storage medium of claim 16, wherein the instructions to check the indicator comprise instructions to:

determine that a bit at a head of the respective queue indicates that the matching results are available to be used when processing a remainder of the associated message;

determine that a credit is available to return the matching results; and responsive to determining that the bit is set and that the credit is available, determine that the respective queue is allowed to access the matching results, receive a notification of an error associated with the multi-packet message, the notification comprising an error response packet associated with the multi-packet message; and log the error associated with the multi-packet message.

* * * * *